INVENTORS
ANKER K. ANTONSEN
MATTHEW L. FOREMAN
BY George A. Woodruff
ATTORNEY

United States Patent Office 3,411,289
Patented Nov. 19, 1968

3,411,289
TURBOCHARGED OPPOSED PISTON ENGINE HAVING IMPROVED AIR CHARGING AND SCAVENGING
Anker K. Antonsen and Matthew L. Foreman, Beloit, Wis., assignors to Fairbanks Morse Inc., New York, N.Y., a corporation of Delaware
Filed Mar. 21, 1967, Ser. No. 624,814
8 Claims. (Cl. 60—13)

ABSTRACT OF THE DISCLOSURE

A two cycle compression-ignition engine of opposed piston, uniflow scavenged form, supplied with combustion and scavenging air by an exhaust driven turbocharger, the engine having one piston of larger diameter than the other, air ports controlled by the larger piston and directed to establish air flow helically through the cylinder space, and an exhaust discharge system including exhaust ports controlled by the smaller piston, the system providing two volute-form exhaust passages of unequal length terminating in adjacent outlets, the longer passage being common to a majority of the exhaust ports which ports are directed for discharge generally in the direction of the helical air flow in the cylinder space, and the exhaust ports opening to the shorter passage being directed oppositely to the first mentioned ports, whereby to attain optimum scavenging and exhaust discharge, with reduced pressure drop through the engine for improving exhaust drive of the turbocharger.

---

This invention relates to compression-ignition engines of two cycle, opposed piston, uniflow scavenged type, and more particularly to improvements in the air charging and scavenging of an engine of such type in which the opposed pistons are of different diameter and in which combustion and scavenging air is supplied by an exhaust driven turbocharger. The improvements hereinafter set forth are applicable to engines of the indicated form, operating on liquid fuel as a diesel engine, or on gaseous fuel with spark ignition or liquid fuel ignition commonly referred to as a dual-fuel engine.

In an engine of the type indicated having the piston of greater diameter controlling air ports in the greater diameter section of a stepped cylinder, the lesser diameter piston controlling exhaust ports in the cylinder section of smaller diameter, and a conventional annular exhaust receiving cavity about the exhaust ports, certain operational difficulties have been experienced. In such an engine wherein the air ports are directed to produce a desirable helical air flow in the cylinder toward the exhaust ports, the passage of air and combustion gases into the smaller diameter cylinder section is under increased flow velocity therein and through the exhaust ports. With conventional exhaust port directioning to have certain ports discharging in the direction of helical cylinder flow and the remainder directed oppositely, it is found that especially consequent to increased velocity of discharge, very considerable exhaust turbulence occurs in the exhaust receiving cavity on the side thereof open to the oppositely directed exhaust ports. In particular, tests have indicated that a very high degree of turbulence occurs in a localized zone of the cavity remote from the cavity outlet. Such turbulence interferes with desired exhaust pressure deliverey flow to the turbocharger, and produces a degree of pressure drop in the exhaust system in particular, resulting in surging of the turbocharger with consequent erratic air charging of the engine and lowered engine operating efficiency.

An object of the invention is to provide for an engine of the character indicated, improvements in the cylinder air and exhaust porting and exhaust receiving means directly associated with the exhaust ports, affording reduced turbulence with decrease in pressure drop in the exhaust discharge system of the engine, whereby to attain effective operation of the exhaust driven turbocharger and improved engine air charging and exhaust discharge.

The foregoing and other objects and advantages of the present improvements will appear from the following description of a presently preferred embodiment of the invention illustrated in the accompanying drawings, wherein.

Figure 1:
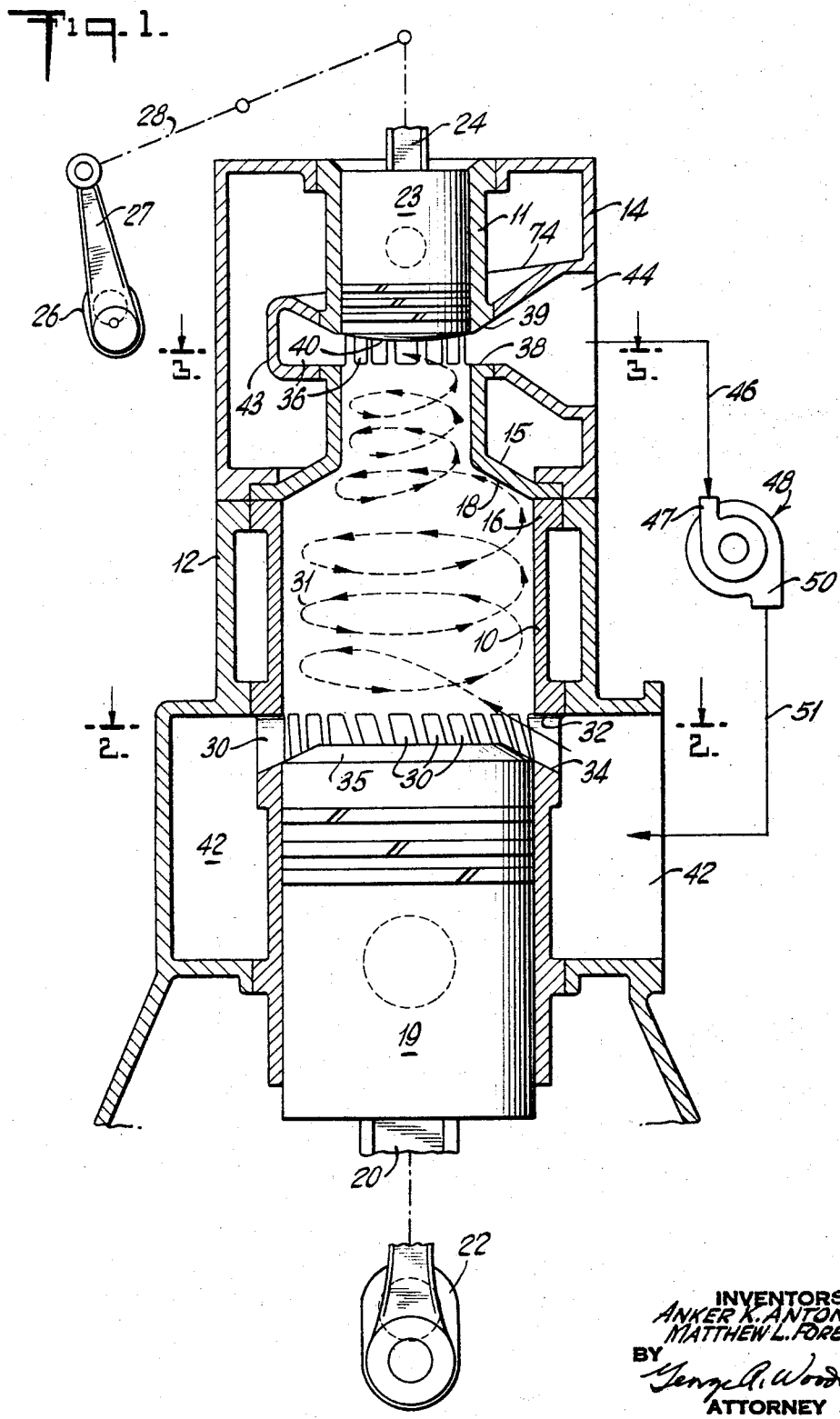
FIG. 1 is a generally diagrammatic view in section, of an engine cylinder and opposed piston assembly embodying the present improvements.

FIG. 1 illustrates a stepped cylinder, opposed piston arrangement for single or multi-cylinder engines of the type hereinbefore indicated. As shown, the cylinder is comprised of two sections or cylinder liner members 10 and 11, liner 10 being of a given internal diameter and supported by main frame 12. Liner 11 coaxial with liner 10 and extending thereabove, has an internal diameter less than that of liner 10 to a predetermined extent, and is carried in an upper frame 14. The lower end portion 15 of liner 11 is flanged outwardly to junction with upper end 16 of liner 10, forming a generally frusto-conical throat 18.

Operating in liner 10 is a piston 19 of correspondingly large diameter, having connecting rod 20 extending to a lower crankshaft indicated diagrammatically at 22. A small diameter piston 23 opposed to piston 19, operates in liner 11 and as indicated schematically, has its connecting rod 24 in operative connection to an upper crankshaft 26 through suitable linkage as rod 27 and rocker arm 28. The two crankshafts are interconnected by suitable gearing or other means (not shown), while the rocker arm linkage to piston 23 is such as to determine the full travel of that piston at one-half the full travel of piston 19.

Figure 2:
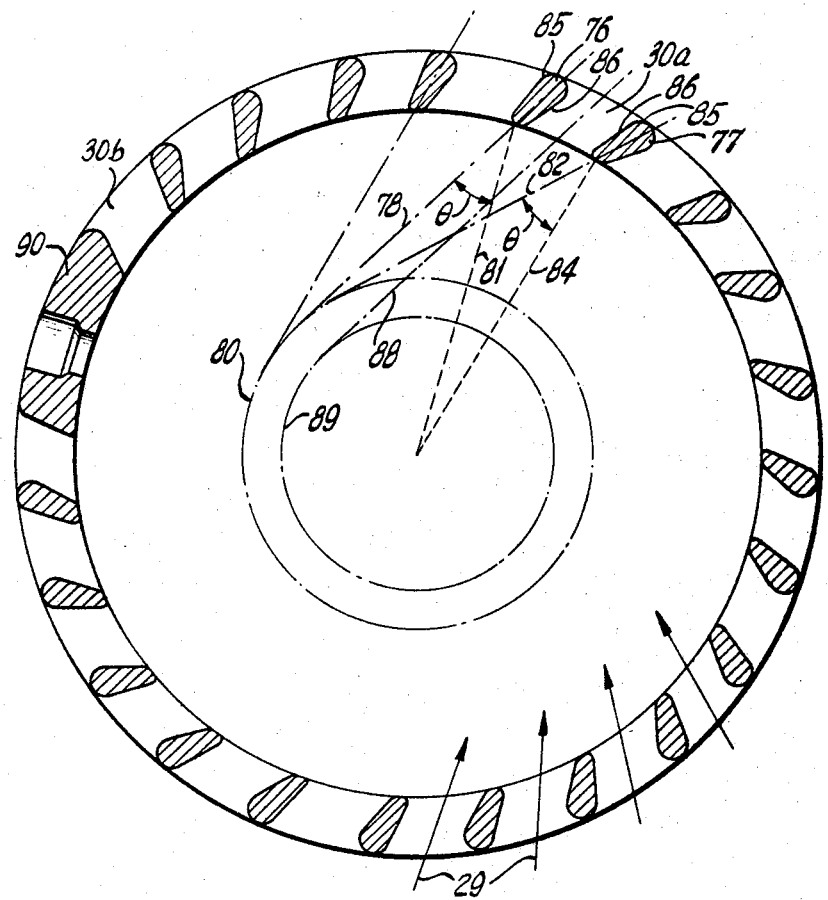
FIG. 2 is a sectional view of the cylinder air ports, the view being taken on line 2—2 in FIG. 1.

Formed in liner 10 are air admission ports 30 controlled by piston 19, these ports as shown in FIG. 2 and to be more fully described hereinafter, being arranged in a series or band circumferentially of the liner. The ports further are all similarly directed angularly relative to the cylinder radial direction, for air admission generally tangentially into the liner (indicated by port-flow arrows 29 in FIG. 2) to establish a generally helical or spiral flow upwardly through liner 10 into liner 11, as indicated at 31 in FIG. 1. The upper margins 32 of the air ports preferably are normal to the cylinder axis (FIG. 1), for precise port opening and closing control by piston 19, while the lower port margins 34 are suitably inclined upwardly in the direction of the liner interior, to direct air admission for upward spiral flow in the liner. Such upward flow is aided by the frustoconical crown 35 of piston 19, the surface slope of which may be substantially the same as that of the port margins 34, as shown in FIG. 1.

A circumferential series or band of exhaust ports 36 is provided in liner 11, under control by the piston 23. These ports, to be hereinafter more particularly described in reference to the showing thereof in FIG. 3, have the lower margins 38 normal to the cylinder axis for precise opening and closure control by piston 23. The upper port margins 39 are inclined upwardly and outwardly, while the crown 40 of piston 23 has a dome shape, all as shown in FIG. 1, whereby to aid exhaust discharge.

Although the pistons 19 and 23 are shown in FIG. 1 at outer dead center position, in practice and as is well known in the art port timing control may be attained through selected phase lead of one piston relative to the other, usually a lead of the exhaust piston relative to the air piston, for promoting better combustion and scavenging.

Referring further to FIG. 1, frame 12 in cooperation with liner 10 provides a plenum chamber or manifold 42 for air supply to the ports 30. The upper frame 14 has exhaust collector passage means 43 open to the exhaust ports 36, for exhaust discharge at outlet 44. Passage means 43 is of particular construction in accordance with the present invention, and will be described hereinafter in connection with the view of FIG. 3. Exhaust gases are led from outlet 44 over line 46 representing an exhaust manifold or delivery duct, to the intake of the turbine section 47 of a suitable turbocharger 48 having air compressor section 50 operated from the turbine section. Air under pressure output from section 50 is delivered over line 51 representing a suitable conduit, to the plenum chamber 42.

Considering the scavenging cycle in the engine as thus far described, air under turbocharger supply pressure in plenum chamber 42 passes through ports 30 and flows helically in and upwardly through liner 10. Such helical air flow entrains the gaseous products of combustion in helical movement therewith, the combined air and gases passing through throat 18 into the smaller diameter liner 11 with consequent increased flow velocity in the latter, toward and outwardly through the exhaust ports. The frusto-conical shape of throat 18 provides both clearance for the frusto-conical crown of piston 19 when the latter is in inner dead center position, and a gas transfer nozzle to facilitate gas passage into liner 11 under continued helical flow therein.

Figure 4:
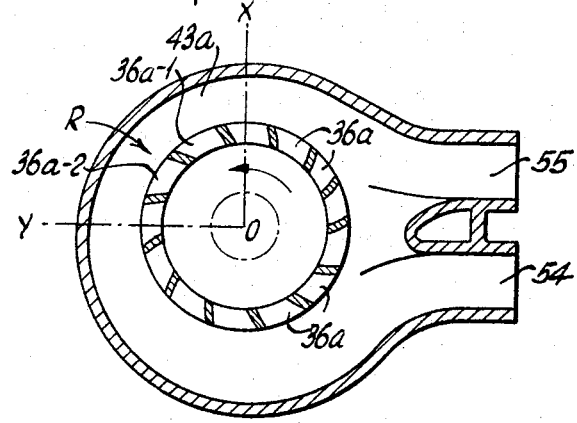
FIG. 4 is a sectional view similar to that of FIG. 3 but illustrating exhaust ports and passage means of known or conventional form.

As hereinbefore indicated, certain operational difficulties have been encountered where in an engine of the character shown in FIG. 1 the exhaust ports 36 and exhaust collector means 43 are provided in known or conventional forms such as illustrated in FIG. 4. As there shown, exhaust ports 36a are directed substantially uniformly at an angle to the cylinder radial direction, the outward directioning of each port being generally in the direction of the swirl or helical air and gas flow in the cylinder (indicated by arrow 52). All ports 36a open to an annular exhaust receiving passage 43a, the passage extending at one side to adjacent discharge outlets 54 and 55. Considering the cylinder swirl direction as indicated, and the high velocity exit of the exhaust gases through the ports 36a as accentuated by the increase in flow velocity of the gases as such pass through throat 18 into the smaller diameter liner 11 (FIG. 1), it is found that very considerable gas turbulence occurs in the portion of passage 43a extending over the quadrant X–O–Y remote from the outlets 54–55 (line X–O being parallel with the longitudinal axis of crankshaft 22, FIG. 1). It is further found that such turbulence is present in high degree in a localized zone of the indicated passage quadrant, being the passage region identified by R generally between the adjacent exhaust ports 36a–1 and 36a–2 and having its center at approximately the angular mid-point of the passage quadrant (or on a cylinder radius at 45 degrees to line X–O).

The high turbulence in the exhaust arrangement according to FIG. 4 produces an undesirable degree of pressure drop in such portion of the exhaust system, and results in turbulent exhaust delivery flow to the turbocharger at undesirably decreased flow pressure. As a consequence, surging of the turbocharger has been experienced under certain engine operating conditions, resulting in erratic air charging of the engine. Turbocharger surging is found to be especially prominent under engine operation at about 20% below rated horsepower.

Figure 3:
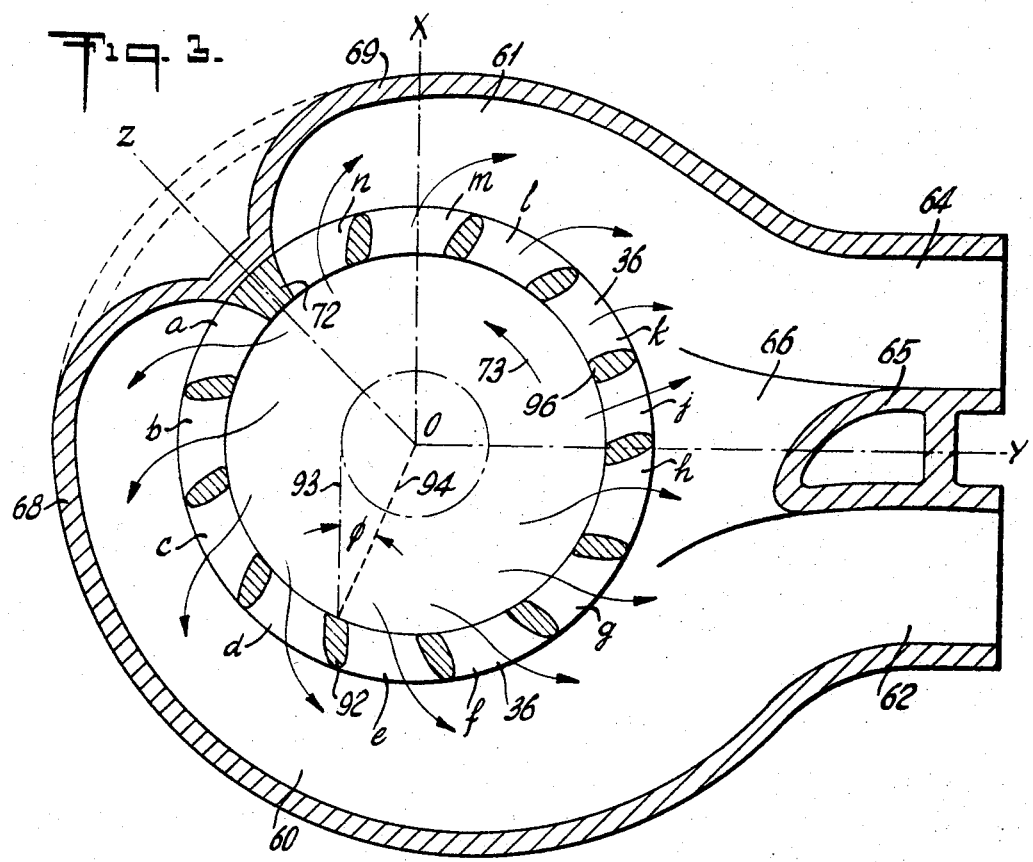
FIG. 3 is a sectional view showing the exhaust porting and discharge passages according to the invention, the view being taken on line 3—3 of FIG. 1.

The present improvements overcome the foregoing difficulties and provide for more effective air charging and exhaust discharge in an engine of the character described. Referring to FIG. 3, the exhaust collector passage means 43 shown in FIG. 1 is formed to provide separate curved channels 60 and 61 leading to respective outlet ends 62 and 64 in relative adjacence and separated by a wall member 65, the channels being in communication in the region 66 between the wall 65 and the adjacent side of cylinder liner 11. Separation of the channels is provided by joining the wall 68 defining channel 60 and wall 69 defining channel 61, at junction 70 and extending the junction inwardly toward the cylinder axis such that it will be in surface contact with a wall element 72 of cylinder liner 11 in liner assembly to frame 14. As related to the air and gas swirl direction in liner 11 (arrow 73), and considering reference line X–O to the center axis of liner 11 and parallel with the longitudinal axis of crankshaft 22 (FIG. 1), the channel separating junction 70 is located in the formation of frame 14, to be centered relative to a reference line Z–O angularly displaced from reference line X–O on the side of the latter remote from channel outlets 62, 64, by an angle of approximately forty-five degrees (45°). It will be appreciated that liner wall element 72 affords an index for proper angular positioning of the liner in mounting thereof to frame 14, and provides a reference point to opposite directioning of the exhaust ports, as this will become evident from subsequent description of the ports.

In consequence of the above described channel division, channel 60 has a greater angular extent than that of channel 61, its angular length between the junction 70 and the mid-line of zone 66 (as on reference line Y–O normal to reference line X–O) subtending an angle greater than one hundred eighty degrees (180°) and approaching two hundred twenty five degrees (225°). The shorter channel 61 in its length between junction 70 and the mid-line of zone 66, subtends an angle greater than ninety degrees (90°), approaching an angle of one hundred thirty five degrees (135°). Thus and since the exhaust ports 36 are generally equally spaced circumferentially of the liner 11, channel 60 is common to a majority of the ports. Such ports are indicated in FIG. 3 as ports a, b, c, d, e, f, g and h, and these constituting a first port series, are given like direction angularly relative to the cylinder radial direction, generally in the direction of gas swirl in the liner to facilitate port exit of exhaust gases into channel 60. The remaining exhaust ports j, k, l, m and n open to the shorter channel 61, and of these the ports k, l, m and n constitute a second port series having like directioning angularly relative to the cylinder radial direction, but oppositely to the direction of the first port series. In the present example, the single port j which separates the two series of angled ports, is given a radial direction.

It will appear now in view of the improved exhaust arrangement according to FIG. 3 that the exhaust discharge collector passage means is provided by separate channels divided by the junction 70 in contact association with liner wall element 72, and that the channel dividing junction 70 is located in the zone (zone R in FIG. 4) of greatest turbulence found to exist in the annular collector passage means of the known or conventional exhaust arrangement as illustrated in FIG. 4 and hereinbefore described. Consequently, such region of high turbulence is avoided by the present arrangement. The more effective exhaust collection and discharge function attained by the separate channels 60 and 61, is here further improved by forming, as shown in FIG. 3, the wall 68 such as to give the channel 60 a volute shape expanding in the direction of its outlet 62, and similarly forming wall 69 to impart a volute shape to channel 61 with expansion toward its outlet 64. Additionally, the bottom side of each channel defining wall 68 and 69 has its inside surface generally in the plane of the bottom margins 38 (FIG. 1) of the exhaust ports, while the top side of each is sloped upwardly from the bottom side in the direction of the associated channel outlet, so that each channel increases in depth toward its outlet end. Such top side slope is indicated at 74 in FIG. 1 in respect to channel wall 69.

In accordance with the present improvements directed to the attainment of improved engine air charging and scavenging, the hereinbefore noted angled directioning of the air and exhaust ports is here determined by particular angular setting of the port-defining ribs in the cylinder liners. Angular setting of the ribs is predetermined while the ribs are given a streamlined shape to provide nozzle-form ports, whereby to attain as to the air ports pressure air flow therethrough with minimum flow resistance and in direction into the cylinder to establish such helical flow therein assuring substantially complete scavenging sweep of the exhaust gases, and as to the exhaust ports minimum resistance to high velocity exhaust gas flow therethrough and flow directioning into the collector channels such as to approximate desirable laminar flow in the channels to discharge.

Considering first the air ports as shown in FIG. 2, and selecting the port 30a for example, such port having its top and bottom margins 32 and 34 as shown in FIG. 1, has its opposite sides defined by the pair of ribs 76 and 77. Rib 76 is formed so that its longitudinal axis is coincident with a reference line 78 tangent to a reference circel 80 centered on the axis of liner 10 and having its radial dimension predetermined such that the angle $\theta$ between line 78 and the cylinder liner radius 81 intersecting line 78 at the inner surface of rib 76, is between eighteen degrees (18°) and twenty five degrees (25°). Rib 77 is formed in identical manner, to have the same angle $\theta$ between its longitudinal center reference line 82 tangent to circle 80 and cylinder radius line 84 intersecting line 82 at the inner surface of rib 77. Ribs 76 ad 77 further are streamlined, each having its upstream edge 85 rounded as shown in FIG. 2 and its side surface 86 (as well as the opposite side surface) tapered inwardly toward the rib center line. The air port thus formed by the adjacent ribs 76 and 77 is of nozzle form improving smooth entrance of air to the cylinder, and has a center axis on a line of reference 88 tangent to a reference circle 89 within reference circle 80. Such port formation and directioning is identical at all of the air ports, including the ports 30b and 30c on opposite sides of rib 90 which has an angular length greater than the other ribs for a purpose not pertinent to the present invention. Moreover, it is preferred to have the air ports inclined in the direction of the cylinder helical flow, as shown in FIG. 1, to assist directioning of the cylinder air swirl upwardly toward the exhaust ports. Such is accomplished by forming the port-defining ribs to have equal inclination such that the upper end of each rib is forwardly of its bottom end in the direction of the cylinder air swirl. The indicated inclination of the ribs is preferably of the order of twenty degrees (20°) relative to the axial direction of the cylinder.

Referring now to the exhaust ports shown in FIG. 3, the ribs defining the ports, b, c, d, e, f, g and h are streamlined as shown, and have identical angular settings determined in the manner described for the air port ribs. Thus in respect to rib 92 for example, it is set to have its longitudinal axis 93 related to the liner radius 94 intersecting axis 93 at the inner face of the rib, by an angle $\phi$ between eighteen degrees (18°) and twenty five degrees (25°). In like manner the streamlined ribs defining ports l and m which are directed oppositely to the ribs of ports b to h, are set on a longitudinal axis within the same angular range (18°–25°) noted in respect to the setting of rib 92. Streamlined rib 96 between ports j and k has its longitudinal axis coincident with a radius of liner 11, so that the center axes of ports j and k are approximately radial. Port a is defined by the rib between ports a and b and the liner wall element 72, wherein the port-forming side of element 72 is tapered, as shown, for cooperation with the rib to determine the flow axis of port a at approximately the same flow axis angle obtaining at ports b to h. Similarly, the opposite side of liner wall element 72 which with the rib between ports n and m defines port n, is tapered for cooperation with that rib to determine the flow axis of port n at approximately the same flow axis angle obtaining at ports m and l.

While only one cylinder assembly is herein illustrated, such is to be considered as representative of each cylinder where the present invention is applied to a multi-cylinder engine which may have the cylinders arranged in-line or in other relative positions, as in V form for example.

Having now described and illustrated a presently preferred form of the invention, it is to be understood that the form shown is exemplary only, in that certain alterations or modifications may be made thereto without departing from the scope of the invention as hereinafter claimed.

We claim:

1. An opposed piston engine of the character indicated, having a stepped cylinder provided by a large diameter cylinder liner having a circumferential band of air ports therein and a coaxial adjoining smaller diameter cylinder liner having a circumferential band of exhaust ports therein, a piston operable in each liner and controlling the ports thereof, and exhaust collector means associated with the exhaust ports, wherein
    (a) the air ports are directed to establish helical air flow through the cylinder toward the exhaust ports,
    (b) the exhaust port band provides a first series of relatively adjacent ports comprising a majority of the ports in said band, directed for exhaust discharge from the smaller diameter liner generally in the direction of said cylinder helical air flow, and
    (c) a second series of relatively adjacent ports directed oppositely to the ports of said first series,
    (d) and said exhaust collector means is formed to provide separate volute shape channels one common to said first series of exhaust ports and the other common to said second series of exhaust ports.

2. An opposed piston engine of the character indicated, having a stepped cylinder provided by a large diameter cylinder liner having a circumferential band of air ports therein and a coaxial adjoining smaller diameter cylinder liner having a circumferential band of exhaust ports therein, a piston operable in each liner and controlling the ports thereof, and exhaust collector means about the smaller diameter liner in association with the exhaust ports, wherein
    (a) said large diameter liner provides integral ribs defining the air ports, the ribs being directed at a predetermined angle relative to the radial direction of the liner such as to determine uniform direction of the air ports for establishing helical air flow in and through the cylinder toward the exhaust ports,
    (b) said smaller diameter liner provides a first plurality of integral ribs defining a first series of relatively adjacent exhaust ports comprising a majority of the ports in said exhaust port band, said ribs being directed at a predetermined angle relative to the liner radial direction such as to determine uniform direction of the exhaust ports in said first series for exhaust discharge from the liner generally in the direction of said cylinder helical air flow,
    (c) said smaller diameter liner further provides additional integral ribs defining a second series of exhaust ports in said band, said additional ribs being directed oppositely to the ribs in said first series at a predetermined angle relative to the liner radial direction, thereby determining direction of the second series of ports oppositely to the direction of the first series of ports,
    (d) and said exhaust collector means is formed to provide separate volute shape channels one common to said first series of exhaust ports and the other common to said second series of exhaust ports.

3. An opposed piston engine according to claim 2 wherein the said predetermined angle of the ribs defining the said air ports is in a range of 18° to 25°, and the said predetermined angle of the first plurality of ribs defining the said first series of exhaust ports is in a range of 18° to 25°.

4. In a two cycle, opposed piston engine providing means forming a cylinder, opposed pistons operable in the cylinder, the cylinder having a circumferential series of air inlet ports controlled by one of the pistons and a plurality of exhaust ports controlled by the other piston, the improvement therein comprising:
   (a) providing said air ports to have similar direction angularly relative to the radial direction of the cylinder, for establishing air flow helically in the cylinder toward the exhaust ports,
   (b) means forming two separate exhaust discharge channels of generally arcuate trend terminating in adjacent outlets at one side of the cylinder,
   (c) one of said channels subtending an angle approximately 90 degrees greater than the angle subtended by the other channel and being common to a majority of the exhaust ports,
   (d) said other channel being common to the remaining exhaust ports,
   (e) said majority of exhaust ports being similarly angularly directed relative to the cylinder radial direction for exhaust discharge from the cylinder generally in the direction of said helical flow in the cylinder, and
   (f) certain of the remaining exhaust ports being similarly angularly directde relative to the cylinder radial direction but oppositely to the directioning of said majority of exhaust ports.

5. In a two cycle, opposed piston engine providing means forming a stepped cylinder affording a first cylinder section of given diameter and a second cylinder section of a diameter less than that of the first section, opposed pistons in the cylinder one operable in said first section and the other in said second section, a circumferential series of air ports in said first cylinder section and controlled by said one piston and a plurality of exhaust ports in said second cylinder section and controlled by said other piston, the improvement therein comprising:
   (a) providing said air ports to have similar direction relative to the cylinder radial direction for establishing air flow helically in the cylinder sections toward the exhaust ports,
   (b) means forming two separate exhaust discharge channels of generally arcuate trend terminating in adjacent outlets at one side of the cylinder,
   (c) one of said channels subtending an agle approximately 90 degrees greater than the angle subtended by the other channel and being common to a majority of the exhaust ports,
   (d) the other channel being common to the remaining exhaust ports,
   (e) said majority of exhaust ports being similarly angularly directed relative to the cylinder radial direction, for exhaust discharge from the cylinder generally in the direction of said helical flow in the cylinder, and
   (f) certain of the remaining exhaust ports being similarly directed angularly relative to the cylinder radial direction but oppositely to the directioning of said majority of exhaust ports.

6. A two cycle, opposed piston engine according to claim 5 wherein the angle subtended by said one of said channels is greater than 180 degrees.

7. A two cycle, opposed piston engine according to claim 5 wherein each of the said two separate exhaust discharge channels is of volute form increasing in cross-section toward its outlet.

8. In a two cycle, turbocharged opposed piston engine providing means forming a stepped cylinder affording a first cylinder section of given diameter and a second cylinder section of a diameter less than that of the first section, opposed pistons one adapted for operation in said first cylinder section and the other adapted for operation in said second cylinder section, a circumferential series of air ports in said first cylinder section controlled by the piston in said section, and a circumferential series of exhaust ports in the second cylinder section controlled by the piston in said section, and a turbocharger driven by exhaust gas energy from the engine and supplying combustion and scavenging air to said air ports, the improvement therein comprising:
   (a) providing said air ports to have similar direction relative to the cylinder radial direction, for establishing air flow helically in the cylinder sections toward the exhaust ports,
   (b) means forming two separate exhaust discharge channels of generally arcuate trend and terminating in adjacent outlets at one side of the cylinder,
   (c) each of said channels being of volute shape, increasing in cross-section toward its outlet,
   (d) one of said channels subtending an angle less than but approximately 225 degrees and being common to a majority of said exhaust ports,
   (e) the other channel subtending an angle less than but approximately 135 degrees and being common to the remaining exhaust ports,
   (f) said majority of exhaust ports being similarly directed angularly relative to the cylinder radial direction for exhaust discharge from the cylinder generally in the direction of said helical flow in the cylinder, and
   (g) certain of the remaining exhaust ports being similarly directed angularly relative to the cylinder radial direction but oppositely to the directioning of said majority of exhaust ports.

References Cited

UNITED STATES PATENTS

| | | | |
|---|---|---|---|
| 2,067,496 | 1/1937 | McCarthy | 123—51 |
| 2,371,297 | 3/1945 | Huber | 123—65 |
| 2,408,399 | 10/1946 | Kadenacy | 123—51 |
| 2,448,079 | 8/1948 | Carrie | 123—51 |
| 3,071,122 | 1/1963 | Lieberherr | 123—51 |

MARTIN P. SCHWADRON, *Primary Examiner.*

DOUGLAS HART, *Assistant Examiner.*